(12) United States Patent
Meyers et al.

(10) Patent No.: US 12,189,498 B2
(45) Date of Patent: *Jan. 7, 2025

(54) DATABASE RECOVERY AND DATABASE RECOVERY TESTING

(71) Applicant: Insight Direct USA, Inc., Chandler, AZ (US)

(72) Inventors: Shana Meyers, Shakopee, MN (US); Meghasyam Bokam, Charlotte, NC (US); Ian Bundock, Staines-Upon-Thames (GB); Larry N. Cotten, Jr., Huntington Beach, CA (US); Jason Fleck, Spanish Fort, AL (US); Jason Garland, Orange, TX (US); David Gilboy, Leeds (GB); Jeffrey J. Hodges, Gilbert, AZ (US); Chun-Kai Jason Hsu, Austin, TX (US); Lori McFadden, Salina, KS (US); Peter Thomas McLean, Gilbert, AZ (US); Abhijit Moharil, Tempe, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,538

(22) Filed: Oct. 10, 2023

(65) Prior Publication Data
US 2024/0036991 A1     Feb. 1, 2024

Related U.S. Application Data (63) Continuation of application No. 17/686,886, filed on Mar. 4, 2022, now Pat. No. 11,847,031.

(51) Int. Cl.
*G06F 11/14* (2006.01)

(52) U.S. Cl.
CPC ...... *G06F 11/1469* (2013.01); *G06F 11/1464* (2013.01); *G06F 2201/84* (2013.01)

(58) Field of Classification Search
CPC ............ G06F 11/1469; G06F 11/1464; G06F 2201/84
See application file for complete search history.

(56) References Cited

U.S. PATENT DOCUMENTS

| 6,108,671 | A | 8/2000 | Ogawa |
| 7,769,648 | B1 * | 8/2010 | Nolan ................ G06Q 30/0633 |
| | | | 705/28 |

(Continued)

FOREIGN PATENT DOCUMENTS

| CN | 104813276 A | 7/2015 |
| CN | 104714859 B | 10/2017 |

(Continued)

OTHER PUBLICATIONS

International Search Report and Written Opinion for International Application No. PCT/US2023/013969, dated Jun. 30, 2023, 13 pages.

*Primary Examiner* — Merilyn P Nguyen
(74) *Attorney, Agent, or Firm* — Kinney & Lange, P.A.

(57) ABSTRACT

A method of database recovery includes starting a first database server, starting a second database server, starting a third database server, and starting an application server after starting the first database server, the second database server, and the third. The first, second, and third database servers are configured to store data according to first, second, and third database management systems, respectively, and the application server is configured to run application modules of a set of application modules. The method of database recovery further includes starting a search module, starting a product catalog management module, starting a web connectivity module after starting the search module, starting a graphical (Continued)

user interface module after starting the web connectivity module, and starting at least one business operations module.

20 Claims, 4 Drawing Sheets

(56) References Cited

U.S. PATENT DOCUMENTS

| | | | |
|---|---|---|---|
| 8,065,189 B1* | 11/2011 | Ballaro | G06Q 30/0641 |
| | | | 705/26.1 |
| 8,549,114 B2* | 10/2013 | Reddy | H04L 67/10 |
| | | | 709/224 |
| 8,918,366 B2 | 12/2014 | D'Souza et al. | |
| 9,032,247 B2 | 5/2015 | Ahmed et al. | |
| 9,286,369 B2 | 3/2016 | Pei et al. | |
| 9,619,342 B2 | 4/2017 | He et al. | |
| 9,817,726 B2 | 11/2017 | Lee et al. | |
| 10,097,399 B1* | 10/2018 | Pillay | G06F 11/1464 |
| 10,310,949 B1 | 6/2019 | Chakraborty et al. | |
| 10,693,955 B2 | 6/2020 | Lalsangi et al. | |
| 10,795,758 B2 | 10/2020 | Korotaev et al. | |
| 10,992,633 B1 | 4/2021 | Nachman | |
| 2003/0033179 A1* | 2/2003 | Katz | G06Q 10/0631 |
| | | | 705/7.41 |
| 2003/0086549 A1* | 5/2003 | Boehmke | H04M 3/2218 |
| | | | 379/201.05 |
| 2003/0139975 A1 | 7/2003 | Perkowski | |
| 2005/0251456 A1 | 11/2005 | Perkowski | |
| 2007/0226064 A1* | 9/2007 | Yu | G06Q 20/201 |
| | | | 705/37 |
| 2014/0258241 A1 | 9/2014 | Chen et al. | |
| 2014/0304230 A1 | 10/2014 | Simon et al. | |
| 2016/0197993 A1* | 7/2016 | Perkowski | H04L 67/02 |
| | | | 709/203 |
| 2016/0253400 A1 | 9/2016 | Mcalister et al. | |
| 2018/0239677 A1 | 8/2018 | Chen et al. | |
| 2019/0138402 A1 | 5/2019 | Bikumala et al. | |
| 2020/0134686 A1 | 4/2020 | Fahey et al. | |
| 2021/0271390 A1 | 9/2021 | Shemer et al. | |
| 2021/0279150 A1 | 9/2021 | Mogilevskiy et al. | |
| 2023/0153302 A1* | 5/2023 | Shen | G06F 16/256 |
| | | | 707/716 |

FOREIGN PATENT DOCUMENTS

| | | |
|---|---|---|
| IN | 201741019336 A | 12/2018 |
| IN | 355643 B | 1/2021 |

* cited by examiner

DATABASE RECOVERY AND DATABASE RECOVERY TESTING

CROSS-REFERENCE TO RELATED APPLICATION

This application is a continuation of U.S. Pat. No. 11,847,031, issued Dec. 19, 2023, and entitled "DATABASE RECOVERY AND DATABASE RECOVERY TESTING," the disclosure of which is hereby incorporated by reference in its entirety.

BACKGROUND

The present disclosure relates to computer databases and servers, more particularly, methods and systems for performing database recovery and database recovery testing.

Databases can be used to store data useful to the business operations of an organization. A database can be connected to other servers in a server system, and the data stored on the database can be accessed and used by the other servers. During operation of a server system, one or more servers of a server system can experience unexpected catastrophic failure, resulting in loss of a significant portion or all of the data stored on the failed server. Further, functions performed by the server or other servers in the server system are often halted until the server or server system is recovered.

SUMMARY

According to one aspect of the present disclosure, a method of database recovery includes starting a first database server, starting a second database server, starting a third database server and starting an application server after starting the first database server, the second database server, and the third database server. The first database server is configured to store data according to a first database management system, the second database server is configured to store data according to a second database management system, the third database server is configured to store data according to a third database management system, and the application server is configured to run application modules of a set of application modules. The set of application modules a web connectivity module configured to allow other application modules of the set of application modules to connect to the Internet, a search module for searching at least one of the first database server and the second database server, a product catalog management module for managing a product catalog a graphical user interface module configured to allow a user to interact with one or more application modules of the set of application modules, and at least one business operations module. The method of database recovery further includes starting the search module, starting the product catalog management module, starting the web connectivity module after starting the search module, starting the graphical user interface module after starting the web connectivity module, and starting the at least one business operations module. The web connectivity module is configured to request data from the search module, the graphical user interface module is configured to request data from the web connectivity module and to request data from the search module, and the at least one business operations module is configured to request data from at least one of the search module, the product catalog management module, and the web connectivity module.

According to another aspect of the present disclosure, a method of performing a database recovery test includes disconnecting a first backup database server from a first active database server, disconnecting a second backup database server from a second active database server, disconnecting a third backup database server from a third active database server, and disconnecting a backup application server from an active application server. The method further comprises assigning new network configurations to the first backup database server, the second backup database server, the third backup database server and the backup application server after disconnecting the first backup database server, the second backup database server, the third backup database server, and the backup application server. After the new network configurations are assigned, the new network configurations for the first backup database server and the second backup database server are provided to the backup application server. The method further comprises transitioning the first backup database server to an active state from an inactive state after providing the new network configurations to the backup application server, transitioning the second backup database server to an active state from an inactive state, and transitioning the backup application server to an active state from an inactive state after transitioning the first backup database server to an active state, transitioning the second backup database server to an active state, and transitioning the third backup database server to an active state. The first backup database server is configured to store data according to a first database management system, the second backup database server is configured to store data according to a second database management system, and the third backup database server is configured to store data according to a third database management system. The first backup database server is configured to back up a first set of data from the first active database server, the second backup database server is configured to back up a second set of data from the second active database server, the third backup database server is configured to backup a third set of data from the third active database server, and the backup application server is configured to back up application modules of a set of application modules from the active application server. The backup application server is also configured to run the application modules of the set of application modules. The first database management system is configured to recall data when the first backup database server is active, the second database management system is configured to recall data when the second backup database server is active, the third database management system is configured to recall data when the third backup database server is active, and the backup application server is configured to recall data from at least one of the first backup database server, the second backup database server, and the third backup database server. The method of performing a database recovery test further comprises starting the set of application modules, validating connections used by application modules of the set of application modules, stopping the set of application modules after validating connections, transitioning the backup application server to an inactive state after stopping the set of application modules, and transitioning the first backup database server, the second backup database server, and the third backup database server to inactive states after transitioning the backup application server to an inactive state. After transitioning the first backup database server the second backup database server, and the third backup database server to inactive states, the first backup database server is reconnected to the second active database server, the second backup database server is reconnected to the second active database server, the third backup database server is reconnected to the third active database server, and the backup application server is reconnected to the active application server.

DETAILED DESCRIPTION

The present disclosure relates to methods and systems for performing database recovery. In particular, the methods and systems disclosed herein allow for database recovery and database recovery testing to be performed in significantly less than existing techniques. Due to the complexity of software and hardware dependencies of modern database and application servers, existing methods of database recovery commonly result in numerous software errors that often halt the progress of database recovery until resolved. Notably, the software errors that occur during conventional methods of database recovery can take significant time to troubleshoot, increasing the overall time required to perform database recovery. Advantageously, the methods disclosed herein provide an ordered process for starting various servers and application modules that significantly reduces the number of errors encountered while performing database recovery. By reducing the number of errors encountered during database recovery, the methods disclosed herein require less troubleshooting than conventional methods and, accordingly, require less time to perform than conventional methods. Notably, reducing the time required to perform database recovery reduces the total time a server system is offline following a data loss event, thereby also reducing the total time that business operations reliant on the server system are disrupted.

Figure 1:
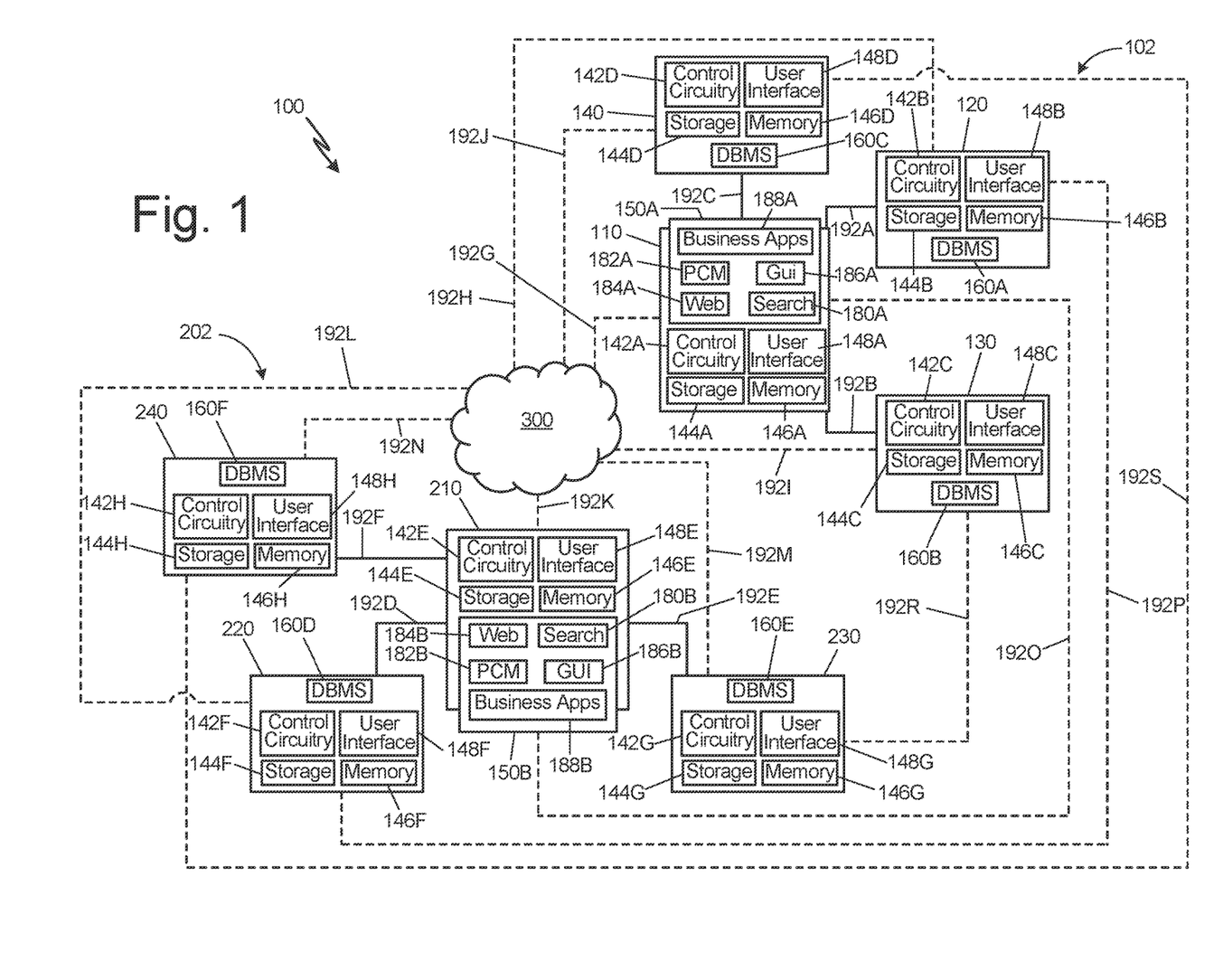
FIG. 1 is a schematic view of an example of a server backup system, including active and backup database and application servers, suitable for use with the methods of FIGS. 2-4.

FIG. 1 is a schematic diagram of backup server system 100, which can be used to backup and restore a business server system. As will be explained in more detail subsequently, business server system 100 is an example of a server system suitable for the database recovery and recovery testing methods outlined in FIGS. 2-4.

Backup server system 100 includes business server system 102 and backup business server system 202. Business server system 102 includes application server 110, first database server 120, second database server 130, and third database server 140. Application server 110 includes control circuitry 142A, storage 144A, memory 146A, user interface 148A, and application module set 150A. First database server 120 includes control circuitry 142B, storage 144B, memory 146B, user interface 148B, and database management system (DBMS) 160A. Second database server 130 includes control circuitry 142C, storage 144C, memory 146C, user interface 148C, and DBMS 160B. Third database server 140 includes control circuitry 142D, storage 144D, memory 146D, user interface 148D, and DBMS 160C. Application server 110 is connected to first database server 120 via communication link 192A, to second database server 130 via communication link 192B, and to third database server 140 via communication link 192C. Application module set 150A includes product catalog management (PCM) module 182A, web connectivity module 184A, search module 180A, and business application modules 188A.

Backup business server system 202 includes backup application server 210, first backup database server 220, second backup database server 230, and third backup database server 240. Backup application server 210 includes control circuitry 142E, storage 144E, memory 146E, user interface 148E, and backup application module set 150B. First backup database server 220 includes control circuitry 142F, storage 144F, memory 146F, user interface 148F, and DBMS 160D. Second backup database server 230 includes control circuitry 142G, storage 144G, memory 146G, user interface 148G, and DBMS 160E. Third backup database server 240 includes control circuitry 142H, storage 144H, memory 146H, user interface 148H, and DBMS 160F. Backup application server 210 is connected to first backup database server 220 via communication link 192D, to second backup database server 230 via communication link 192E, and to third backup database server 240 via communication link 192F. Backup application module set 150B includes search module 180B, PCM module 182B, web connectivity module 184B, graphical user interface (GUI) module 186B, and business application modules 188B.

As depicted in FIG. 1, backup server system 100 also includes cloud network 300, which can be used in some embodiments to connect business server system 102 and backup business server system 202. Communication links 192G-192S are used to connect business server system 102 and backup business server system 202, and will be discussed in more detail subsequently.

Control circuitry 142A-142H executes software, applications, and/or programs stored on memory 146A-146H and/or storage 144A-144H. Control circuitry 142A-142H can include one or more of a microprocessor, a controller, a digital signal processor (DSP), an application specific integrated circuit (ASIC), a field-programmable gate array (FPGA), or other equivalent discrete or integrated logic circuitry. Each of control circuitry 142A-142H can be entirely or partially mounted on one or more boards. Control circuitry 142A-142H can be of any type suitable for operating in accordance with the techniques described herein. In some examples, each of control circuitry 142A-142H can be implemented as a plurality of discrete circuitry subassemblies.

Storage 144A-144H is machine-readable data storage capable of retrievably housing stored data, such as database or application data. In some examples, storage 144A-144H includes long-term non-volatile storage media as noted hereinafter. Non-volatile storage media can include but are not limited to magnetic hard discs, optical discs, flash memories and other forms of solid-state memory, or forms of electrically programmable memories (EPROM) or electrically erasable and programmable (EEPROM) memories. As compared to memory 146A-146H, described subsequently, storage 144A-144H is suited for long-term and/or persistent data storage. Data stored on 144A-144H can be structured or unstructured, as required by the database management system (discussed in more detail subsequently) used to manage the data.

Memory 146A-146H is configured to store information and, in some examples, can be described as a computer-readable storage medium. In some examples, a computer-readable storage medium can include a non-transitory medium. The term "nontransitory" can indicate that the storage medium is not embodied in a carrier wave or a propagated signal. In certain examples, a non-transitory storage medium can store data that can, over time, change (e.g., in RAM or cache). In some examples, memory 146A-146H can include temporary memory, meaning that a primary purpose of the computer-readable memory is not long-term storage. Any and/or all of memory 146A-146H, in some examples, can be described as a volatile memory, meaning that the memory does not maintain stored contents when electrical power to the controller is removed. Examples of volatile memories can include random access memories (RAM), dynamic random-access memories (DRAM), static random-access memories (SRAM), and other forms of volatile memories. In some examples, memory 146A-146H can be used to store program instructions for execution by one or more processors of the controller. For instance, memory 146A-146H can be used by software or applications executed by the control circuitry 146A-146H to temporarily store information during program execution. In some examples, memory 146A-146H includes non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

User interface 148A-148H is an input/output device configured to provide and/or receive information from the user. User interface 148A-148H can be of any form that enables operator interaction with circuitry 142A-142H. For example, user interface 148A-148H, can include a display device for presenting information to and/or receiving input from an operator. User interface 148A-148H can include graphical control elements, such as graphical buttons presented at the display device. User interface 148A-148H, in some examples, includes physical navigation and control elements, such as physically actuated buttons or other physical navigation and control elements. User interface 148A-148H, in some examples, includes audio elements, such as a microphone and/or speakers, to facilitate audio communication with the operator. User interface 148A-148H can include one or more of any input and/or output devices and control elements that can enable operator interaction with application server 110, first database server 120, second database server 130, backup application server 210, first backup database server 220, and second backup database server 230, respectively.

DBMS 160A-160F are database management systems. As used herein, a "database management system" refers to a system of organizing data stored on a data storage medium, such as storage 144A-14HG. In some examples, a database management system described herein is configured to run operations on data stored on the data storage medium. The operations can be requested by a user and/or by another application, program, and/or software. The database management system can be implemented as one or more computer programs stored on a memory device, such as memory 146A-146H, and executed by control circuitry, such as control circuitry 142A-142H, to organize and/or perform operations on data stored on a data storage medium. As depicted in FIG. 1, DBMS 160A organizes data on storage 144B of first database server 120, DBMS 160B organizes data on storage 144C of second database server 130, DBMS 160C organizes data on storage 144D of third database server 240, DBMS 160D organizes data on storage 144F of first backup database server 220, DBMS 160E organizes data on storage 144G of second backup database server 230, and DBMS 160F organizes data on storage 144H of third backup database server 240. As will be explained in more detail subsequently, first backup database server 220 backs up data from first database server 120, second backup database server 230 backs up data from second database server 130, and third backup database server 240 backs up data from third database server 140. Accordingly, DBMS 160A and DBMS 160D are the same or organize data in substantially the same manner, DBMS 160B and DBMS 160E are the same or organize data in substantially the same manner, and DBMS 160C and DBMS 160F are the same or organize data in substantially the same manner. In some examples, DBMS 160A,160D are different, DBMS 160B, 160E are different, and/or DBMS 160C, 106F are different, such that each of business server system 102 and backup business server system 202 include different types of databases for organizing data.

Communication links 192A-192S are configured to allow transmittal of data between server components of backup server system 100 and can be wired or wireless connections. As described previously, communication link 192A connects application server 110 to first database server 120, communication link 192B connects application server 110 to second database server 130, communication link 192C connects application server 110 to third database server 140, communication link 192D connects backup application server 210 to first backup database server 220, communication link 192E connects backup application server 210 to second backup database server 230, and communication link 192F connects backup application server 210 to third backup database server 240. Communication links 192G, 192H, 192I, and 192J connect application server 110, first database server 120, second database server 130, and third database server 140, respectively, to cloud network 300. Communication links 192K, 192L, 192M, and 192N connect backup application server 210, first backup database server 220, second backup database server 230, and third backup database server 240 respectively, to cloud network 300. In other embodiments, business server system 102 and backup business server system 202 are additionally and/or alternatively connected by direct communication links that do connect to cloud network 300. In these embodiments, application server 110 is connected to backup application server 120 via communication link 192O, first database server 120 is connected to first backup database server 220 via communication link 192P, second database server 130 is connected to second backup database server 230 via communication link 192R, and third database server 140 is connected to third backup database server 240 via communication link 192S.

Application module set 150A is a group of application modules stored on storage 144A that can be executed by control circuitry 142A. In the depicted embodiment, application module set 150A includes search module 180A, PCM module 182A, web connectivity module 184A, GUI module 186A, and business application modules 188A. In other embodiments, however, application module set 150A can contain additional and/or alternative application modules. The application modules included in application module set 150A can be selected based on business need and/or user preference. A user can interact with application modules of application module set 150A and other elements of application server 110 via, for example, user interface 148A and/or GUI module 186A.

Search module 180A is configured to query data stored on first database server 120, second database server 130, and third database server 140. In some examples, search module 180A is configured to allow a user to query database data stored on first database server 120, second database server 130, and third database server 140. Additionally and/or alternatively, search module 180A can handle query requests from other application modules running on application server 110.

PCM module 182A is configured to perform product catalog management for product information stored on first database server 120, second database server 130, and third database server 140. PCM module 182A can import product information, such as a product name, price, or other relevant information, and cause first database server 120, second database server 130, and/or third database server 140 to store the product information to storage 144B, storage 144C, and/or storage 144D, respectively. In some examples, PCM module 182A is configured to organize product data into product catalogs according to product attributes, customer needs, business strategy, and/or another suitable parameter. PCM module 182A can provide product information to other applications, such as one or more of business application modules 188A.

Web connectivity module 184A is configured to manage external connections to business server system 102. Web connectivity module 184A can be further configured to dispatch external requests made to business server system 102. For example, web connectivity module 184A can use search module 180A to query data on first database server 120, second database server 130, and third database server 140 in response to an external request.

GUI module 186A is a graphical user interface and is configured to integrate and display information from other application modules of application module set 150A. User interface 148A can also be configured to access the other application modules of application module set 150A. However, in the depicted example, GUI module 186A is not a component of user interface 148A. Rather, GUI module 186A and user interface 148A are alternative interfaces for interacting with and using application server 110. GUI module 186A is generally configured to require less experience to operate than user interface 148A.

Business application modules 188A are configured to perform one or more tasks useful to the operation of a business. Business application modules 188A can include one or more of, for example, a credit card verification module, a shipping address verification module, a reporting module, a financial consolidation module, or an application module suitable for another business need. In some examples, a user can access and operate one or more of business application modules 188A with GUI module 186A. Application module set 150A includes at least one business application module 188A and can include as many business application modules 188A based on user or operational needs.

In operation, application modules of application module set 150A can access and query data stored on first database server 120, second database server 130, and third database server 140 in order to access and/or store, for example, product information, customer information, and/or any other information relevant based on user and/or business needs. Business application modules 188A can access and query data stored on first database server 120, second database server 130, and third database server 140 via, for example, search module 180A. External users, such as customers, can access front-end applications running on application server 110 and/or data on first database server 120, second database server 130, and third database server 140 via, for example, web connectivity module 184A. Internal users can access application modules of application module set 150A via, for example, GUI module 186A. Each application module of application module set 150A can be started and stopped by input at, for example, user interface 148A of application server 110.

Backup business server system 202 backs up data stored on business server system 102. More specifically, backup application server 210 backs up data stored on application server 110, first backup database server 220 backs up data stored in first database server 120, second backup database server 230 backs up data stored on second database server 130, and third backup database server 240 backs up data stored in third database server 140. As used herein, "backing up" data refers to the process of copying an original set of data to create an identical or substantially identical backup set of data that is stored and can be used to restore the original set of data following a data loss event. Similarly, a "backup" refers to a copy of the original set of data. To this extent, in operation, backup application server 210, first backup database server 220, second backup database server 230, and third backup database server 240 store an application server backup, a first database backup, a second database backup, and a third database backup, which correspond to copies of application server 110, first database server 120, second database server 130, and third database server 140, respectively. At the time of copying, the backups are identical or substantially identical to data stored on application server 110, first database server 120, second database server 130, and third database server 140, respectively.

In operation, storage 144E of backup application server 210 stores a copy of the data stored on storage 144A, including backup application module set 150B. Backup application module set 150B is a copy of application module set 150A and, as described previously, includes search module 180B, PCM module 182B, web connectivity module 184B, GUI module 186B, and business application modules 188B. Search module 180B is a copy of search module 180A, PCM module 182B is a copy of PCM module 182A, web connectivity module 184B is a copy of web connectivity module 184A, GUI module 186B is a copy of GUI module 186A, and business application modules 188B are copies of business application modules 188A. In some examples, storage 144E of backup application server 210 functions as a database and stores application data as binary large objects (BLOBs).

Similarly, storage 144F of first backup database server 220 stores a copy of data on storage 144B of first database server 120. Storage 144G of second backup database server 230 stores a copy of data on storage 144C of second database server 130. Storage 144H of third backup database server 240 stores a copy of data on storage 144D of third database server 140. As such, in some embodiments, As described previously, each set of DBMS 160A,160D, DBMS 160B,160E, and DBMS 160C,160F can be different database management systems or can be the same database management system. In some examples, at least one set of DBMS 160A,160D DBMS 160B,160E, and DBMS 160C, 160F store data as unstructured object data, such as text or binary data. Additionally and/or alternatively, DBMS 160A, 160D, DBMS 160B,160E, and/or and DBMS 160C,160F are relational database management systems (RDBMS), object-relational database management system (ORDBMS), columnar database management systems (CDBMS), document-oriented database management systems (DoDBMS) and/or a multi-model database management system (MMDBMS). For example, one set of DBMS 160A,160D, DBMS 160B,160E, and DBMS 160C,160F can be an RDBMS, a second set of DBMS 160A,160D, DBMS 160B, 160E, and DBMS 160C,160F can be an MMDBMS, and the third set of DBMS 160A,160D, DBMS 160B,160E, and DBMS 160C,160F can be a DoDBMS. In some examples, 160A,160D is Azure SQL Database, DBMS 160B,160E is Oracle Database, and DBMS 160C,160F is MongoDB.

In some examples, backup server system 100 further includes at least name server configured to allow application server 110, first database server 120, second database server 130, and/or third database server 140 to access each other and/or servers of backup business server system 202. The at least one name server can be implemented as another physical server or can be virtualized on one or more servers of business server system 102. The at least one name server can also be implemented as an external name server to which components of backup server system 100 connect via the internet. The name server can be, for example, a name system (DNS) server.

In normal operation, application server 110, first database server 120, second database server 130, and third database server 140 are active servers and backup application server 210, first backup database server 220, second backup database server 230, and third backup database server 240 are inactive servers. As used herein, an active server refers to a server used in a production environment. A production environment refers to a setting in which the server is accessible to intended end users. For example, in a production environment, application module set 150A of application server 110 can be used by intended end users, and data stored on first database server 120, second database server 130, and third database server 140 can be accessed by application module set 150A. Conversely, an inactive server refers to a server that is not used in a production environment. Rather, an inactive server functions to store a backup of data stored on a connected active server. For example, as described previously, backup application server 210, first backup database server 220, second backup database server 230, and third backup database server 240 store an application server backup, a first database backup, a second database backup, and a third database backup, respectively, which correspond to the data held on application server 110, first database server 120, second database server 130, and third database server 140, respectively. In the event of a catastrophic failure of an active server, an inactive server can be transitioned to be an active server.

To reduce data loss upon recovery of business server system 102, backups of each server can be created at regular intervals, such that the most recent backup of each of the first database backup, the second database backup, and the application server backup was created within a threshold interval. The threshold interval can be selected to minimize loss of revenue or customer trust, for example, based on the maximum number of transactions expected to occur between backups. In some examples, backups of one or more servers can be taken every 60 minutes to minimize acceptable data loss. In other examples, backups of one or more servers can be taken every 10 minutes to minimize acceptable data loss. In yet further examples, one or more backup servers can be synchronized to the corresponding active server to minimize acceptable data loss, such that all changes made to the active server are also made to the backup server substantially instantaneously or in the shortest interval possible.

Where a backup server of backup business server system 202 stores data as binary large objects (BLOBs), synchronizing data with a backup server can incur significant monetary costs, especially in examples the backup server is not locally maintained. To reduce costs associated with backing up BLOB data, only changes to the BLOB data can be copied to the backup server and other changes to the storage of the relevant active server, such as operating system updates, can be omitted from the backup process and instead can be made manually to the backup server.

After catastrophic failure of business server system 102, backup server system 100 does not have active servers but retains the inactive servers of backup business server system 202. Backup business server system 202 can be used to perform database recovery and restore the active servers of backup server system 100. In some examples, the active servers are restored by transitioning backup application server 210, first backup database server 220, second backup database server 230, and third backup database server 240 from inactive servers to active servers, and new backup application and database servers can be created by copying the restored active servers to new backup servers. In other examples, the active servers are restored by copying data on backup application server 210, first backup database server 220, second backup database server 230, and third backup database server 240 to new servers, and subsequently bringing the new servers into an active state to replace business server system 102.

The dependencies of application modules of application module set 150A on different components of business server system 102 can be substantially complex. For example, in addition to the dependency of web connectivity module 184A on search module 182A, web connectivity module 184A and search module 182A can be dependent on different database servers of business server system 102. In these examples, loss or inoperability of search module 182A or either of the database servers on which web connectivity module 184A and search module 182A respectively depend can result in inoperability of web connectivity module 184A. Inoperability of web connectivity 184A can, consequently, result in downstream errors in the operation of GUI module 186A and/or business application modules 188A.

Due to the complex dependencies of servers in business server system 102 and application modules of application module set 150A, database recovery of business server system 102 can take a significant amount of time due to errors encountered during database recovery. For example, existing methods of database recovery can take several days or weeks to restore a production environment. While there is no active business server system (e.g., following catastrophic failure of business server system 102 and prior to completion of database recovery), business operations dependent on the business server system are reduced or, in some instances, completely stopped, potentially disrupting revenue generation for a business dependent on the business server system.

Figure 2:
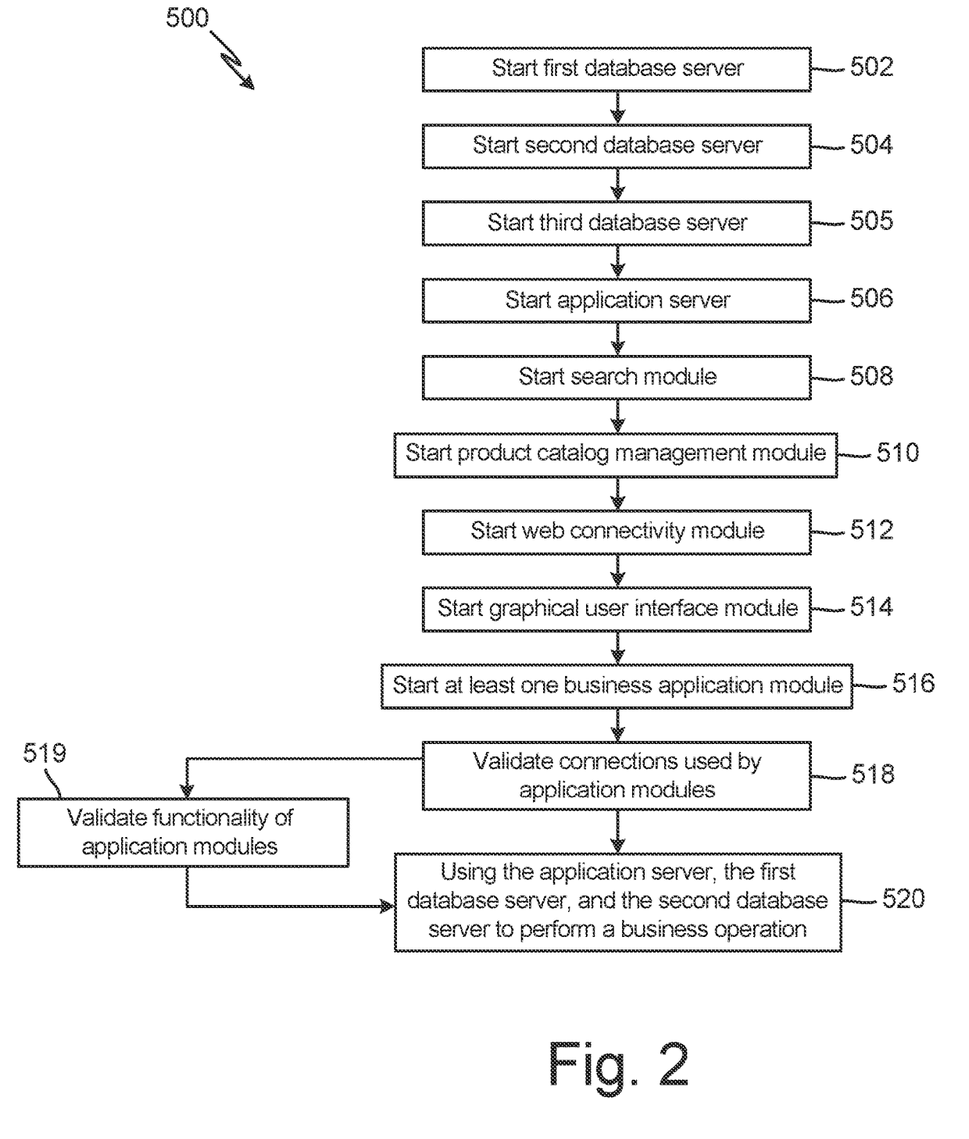
FIG. 2 is a flow diagram of an example of a method of database recovery.

FIG. 2 is a flow diagram of method 500, which is a method of performing database recovery following catastrophic database failure. Following a catastrophic database failure, all data stored on application server 110, first database server 120, second database server 130, and third database server 140 is lost, and those servers are no longer able to function as a production environment. As will be described in more detail subsequently, method 500 advantageously reduces the number of errors encountered during database recovery, reducing the time required to trouble shoot errors and thereby substantially reducing the time require to perform database recovery as compared to existing methods. In some examples, method 500 can perform database recovery and restore a production environment in less than eight hours. Method 500 includes steps of starting a first database server (step 502), starting a second database server (step 504), starting a third database server (step 505) starting an application server (step 506), starting a search module (step 508), starting a product catalog management module (step 510), starting a web connectivity module (step 512), starting a graphical user interface module (step 514), starting a business application module (step 516), validating connections used by application modules (step 518), validating functionality of application modules (step 519), and using the application server, first database server, and second database server to perform a business operation (step 520). For explanatory purposes, method 500 will be discussed with reference to backup server system 100, but method 500 can be used to perform database recovery for a variety of server systems.

Figure 4:
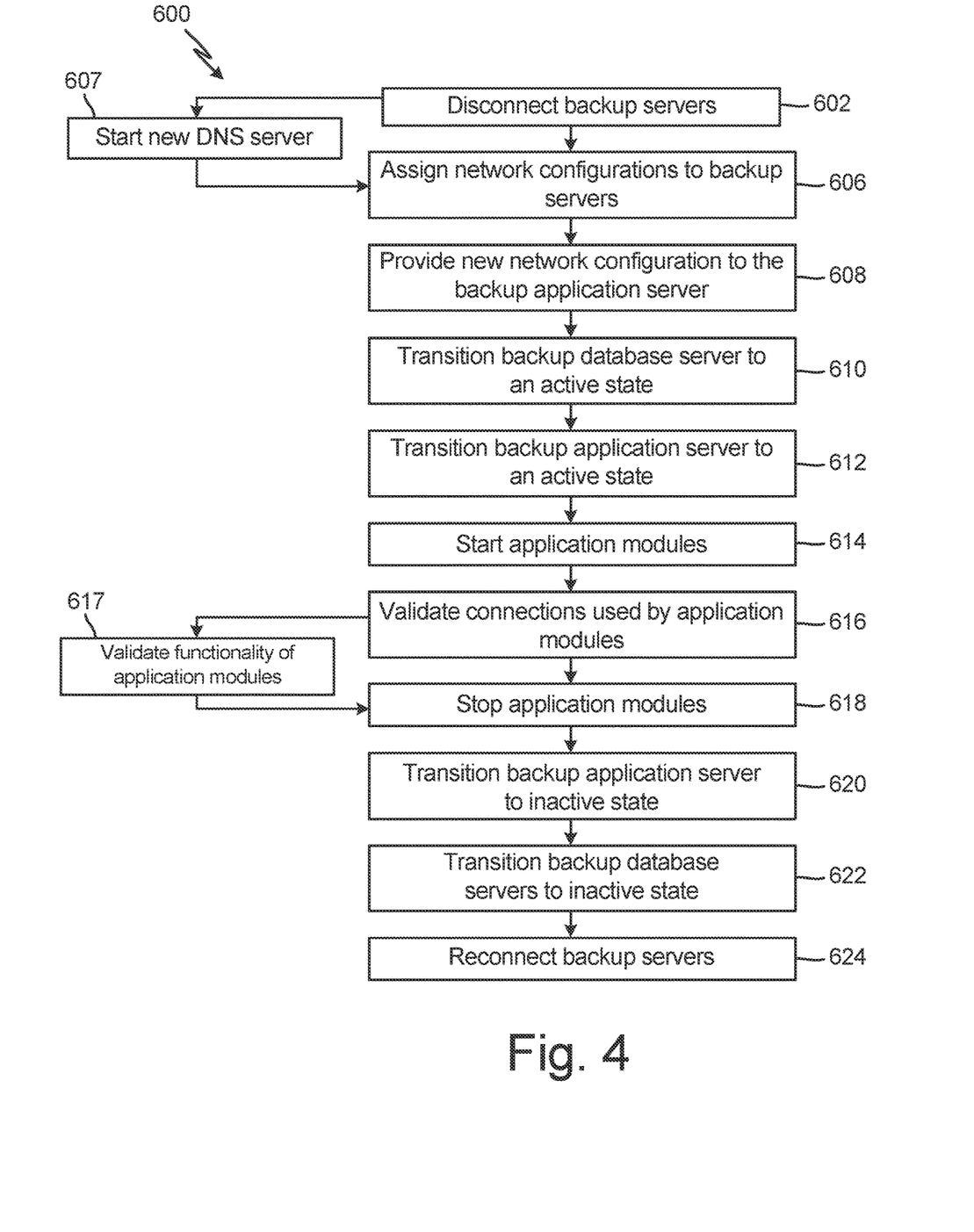
FIG. 4 is a flow diagram of an example of a method of performing a database recovery test.

Following a catastrophic database failure, the data stored on application server 110, first database server 120, second database server 130, and third database server 140 is lost, preventing business server system 102 from performing any business operations. Method 500 is performed following catastrophic database failure. Method 600, which is depicted in FIG. 4 and discussed subsequently, is performed prior to a catastrophic database failure event.

In step 502, first database server 120 is started. As referred to herein, "starting" a server refers to transitioning a server from an inactive state to an active state. First database server 120 can be started following a catastrophic failure by, for example, restoring first database server 120 with first backup database server 220 or by transitioning first backup database server 220 to an active state to replace the failed the active first database server 120. First database server 120 can be restored by copying the first database backup stored on first backup database server 220 to a new server and subsequently bringing the new server into an active state as a new first database server 120.

In step 504, second database server 130 is started. Similar to first database server 120, second database server 130 can be started following a catastrophic failure by, for example, restoring second database server 130 with second backup database server 230 or by transitioning second backup database server 230 to an active state to replace the failed the active second database server 130. Second database server 130 can be restored by copying the second database backup stored on second database backup server 230 to a new server and subsequently bringing the new server into an active state as a new second database server 130.

In step 505, third database server 140 is started. Similar to first database server 120, second database server 130 can be started following a catastrophic failure by, for example, restoring second database server 130 with second backup database server 230 or by transitioning second backup database server 230 to an active state to replace the failed the active second database server 130. Second database server 130 can be restored by copying the second database backup stored on second database backup server 230 to a new server and subsequently bringing the new server into an active state as a new second database server 130.

Generally, the first, second, and third database servers started during steps 502, 504, and 505 are not dependent on each other. To this extent, steps 502-505 can be performed simultaneously or substantially simultaneously. Alternatively, steps 502-505 can be performed in an ordered sequence. For example, step 504 can be performed subsequent to step 502 and step 505 can be performed subsequent to step 504.

In step 506, application server 110 is started. Following catastrophic failure, application server 110 can be started by restoring application server 110 using backup application server 210 or by transitioning backup application server 210 to an active state to replace the failed application server 110. Backup application server 210 can be used to restore application server 110 by, for example, or by copying the application server backup stored on backup application server 210 to a new server and subsequently bringing in the new server into an active state as a new application server 110.

Following steps 502-506, the business server system has a new application server 110 and new first, second, and third database servers 120,130,140 that are capable of performing the functions of the failed application server 110 and the failed first, second, and third database servers 120,130,140. To avoid errors during database recovery according to method 500, step 506 is performed subsequently to steps 502-505. Active application server 110 accesses database data stored on first database server 120, second database 130, and third database server 140 and, for that reason, application server 110 can experience errors if it is brought into an active state before first, second, and third database servers 120,130,140 are restored. As troubleshooting errors that occur during operation of application server 110 can significantly increase the time required to perform method 500, it is advantageous to perform step 506 subsequent to steps 502-505.

Where one or more of steps 502-506 are performed by restoring a server using a backup server, data restoration can be performed using software recovery tools. The recovery tool used for data restoration in each of steps 502-506 can be selected based on the DBMS used on and/or the type of data stored on each server. For example, different recovery tools can be used to restore application server 110 and first database server 120 where application server 110 stores data as BLOBs and where first database server 120 is a relational database. In some examples, different recovery tools are used to restore each of application server 110, first database server 120, second database server 130, and third database server 140 in each of steps 502, 504, 505, and 506, respectively. In other examples, a single recovery tool is used to restore two or more of application server 110, first database server 120, and second database server 130.

In some examples, backup application server 210, first backup database server 220, second backup database server 230, and third backup database server 240 contain multiple backups of application server 110, first database server 120, second database server 130, and third database server 140 respectively, with each backup taken at a different moment in time. As discussed previously, to reduce data loss upon recovery of business server system 102, backups of each server can be taken in regular intervals, such that the most recent backup was created within a threshold interval. The threshold interval can be selected to minimize loss of revenue or customer trust, for example, based on the maximum number of transactions expected to occur between backups.

Further, as described previously, in an active production environment, application server 110 can query and recall data from first database server 120 second database server 130, and third database server 140. If the backups stored on backup application server 210, first backup database server 220, second backup database server 230, and third database server 240 are taken at different times, and in particular if the backups on first database server 220, second database server 230, and third database server 240 used in steps 502-505 are older than the backup on application server 210 used in step 506, the new application server 110 can encounter system inconsistency errors. The system inconsistency errors can be due to, for example, inconsistencies between transaction logs on the new application server 110 and the data on the new first database server 120, the new second database server 130, and the new third database server 140. To prevent or reduce the incidence of system inconsistency errors in subsequently steps 508-518 of method 500, the backups used in steps 502-506 are created at the same time or substantially the same time. For example, new backups of each of application server 110, first database server 120, second database server 130, and third database server 140 can be stored to backup application server 210, first backup database server 220, second backup database server 230, and third backup database server 240, respectively, substantially simultaneously every threshold interval, such that the most recent backup of each server used in steps 502-506 was created at the same time and is also within the threshold interval for reducing acceptable data loss. As system inconsistency errors can increase the time required to perform method 500, it is advantageous to avoid system inconsistency errors during method 500.

In step 508, search module 180A is started. Step 508 is performed following step 506 as application server 110 is configured to run application modules from application module set 150A only while application server 110 is in an active state. As such, application server 110 is not configured to run application modules from application module set 150A while in an inactive state. Requiring application server 110 to be in an active state to run application modules from application module set 150A allows backup application server 210 to store an identical or substantially identical copy of application module set 150A while set to an inactive state so that there is only one instance of each application module. Having multiple instances of a single application module can result in application crashes on application server 110 and/or unwanted or duplicative modifications of database data stored on first database server 120, second database server 130 and/or third database server 140.

In step 510, PCM module 182A is started. Step 510 is performed after step 506 for the same reason as outlined previously with respect to step 508. PCM module 182A is not dependent on and does not use search module 180A in an automated manner. Web connectivity module 184A and GUI module 186A are also not dependent on and do not use PCM module 182A in an automated manner. However, business application modules 188A can be dependent and/or use PCM module 182A. As such, step 510 can be performed at substantially the same time as step 508 or at any point during steps 508-514.

In step 512, web connectivity module 184A is started. Web connectivity module 184A is dependent on and uses search module 180A. As such, web connectivity module 184A can encounter errors if started while search module 180A is inactive. To reduce or prevent errors that may potentially increase the time required to perform method 500 during operation of web connectivity module 184A, step 512 is performed following step 508.

In step 514, GUI module 186A is started. GUI module 186A is dependent on and uses both web connectivity module 184A and search module 180A. GUI module 186A can encounter errors if started while search module 180A and/or web connectivity module 184A are inactive. As such, step 514 is performed after step 512 to prevent or reduce errors during operation of GUI 186A that may significantly increase the time required to perform method 500.

In step 516, at least one business application module of business application modules 188A is started. As described previously, business application modules 188A can be configured to use search module 180A, PCM module 182A, and/or web connectivity module 184A. Further, GUI module 186A can be configured to enable users to use one or more of business application modules 188A. Business application modules 188A can encounter errors if started while one or more of search module 180A, PCM module 182A, and/or web connectivity module 184A are inactive. To reduce or prevent errors that may increase the time required to perform method 500 during operation of business application modules 188A, step 516 is performed after step 514.

In step 518, connections used by application modules of application module set 150A are validated. The connectivity of an application module can be validated by, for example, determining whether the application module can connect to the Internet. Additionally and/or alternatively, connectivity of an application module can be validated by determining whether the application module can connect to first database server 120, second database server 130, and/or third database server 140. As a further example, connectivity of an application module can be validated by determining whether the application module can be accessed via an external connection. In yet further examples, connectivity of an application module can be validated by determining whether a local user is able to access and/or log in to the application module.

The connectivity between application modules of application module set 150A can also be validated in step 518. For example, step 518 can also include validating that web connectivity module 184A can access search module 180A, that GUI module 186A can access web connectivity module 184A and search module 180A, and/or that at least one of the business operations modules can request data from one or more of the search module, the product catalog management module, and the web connectivity module.

It is possible during step 518 that validation of one or more connections used by application module set 150A fails. Failure of a validation performed in step 518 indicates that a problem with the configuration of the restored business server system 102. If a validation performed in step 518 fails, additional troubleshooting can be performed to diagnose and correct the error that caused validation to fail.

Method 500 optionally includes step 519, in which the functions of application modules of application module set 150A are validated. The functions of application modules of application module set 150A can be validated by, for example, testing whether the application modules of application module set 150A are able to operate without experiencing errors. Application modules of application module set 150A can be tested in an automated manner or can be tested manually by, for example, user input at user interface 148A and/or GUI module 186A. Step 519 is generally performed prior to step 520 to ensure that errors are not encountered as application modules of application module set 150A are used to perform a business operation. Further, as the operability of application modules is tested in step 519, performing step 519 is generally performed following step 516 of method 500 to avoid errors and thereby reduce or eliminate the time required to troubleshoot those errors. Step 519 can be performed concurrently or substantially concurrently with step 518 (validating connections) or can be performed subsequent to step 518.

In step 520, the new application server 110, first database server 120, and second database server 130 to are used to perform one or more business transactions. The business transaction can include, for example, allowing an external or internal user to access and use application modules of application module set 150A to, for example, view a product catalog, place an order, determine an order status, or perform another task facilitated by the operation of an application module of application module set 150A. Step 520 is optional and is performed following step 518 of method 500.

Advantageously, method 500 substantially reduces the number of errors encountered during database recovery. Specifically, the order of steps 502-520 reduces the incidence of software errors as method 500 is performed. For example, the order of steps 502-506 can reduce system inconsistency and dependency errors as servers of a server system are started, and the order of steps 508-516 can further reduce the number of software errors encountered as application modules running on an application server are started. By reducing the number of errors encountered during database recovery, method 500 advantageously reduces the amount of troubleshooting required during database recovery and, consequently, reduces the amount of time required to perform database recovery. Due to the time required for troubleshooting, existing methods of database recovery can take several days or weeks. Conversely, method 500 advantageously allows database recovery of a multiple server system, such as business server system 102, to be performed in a significantly shorter time period. In some examples, method 500 can be performed in approximately eight hours. Reducing the amount of time required to perform database recovery, in turn, reduces disruptions to business operations resulting from loss of function of a business server system, thereby reducing loss of business and associated loss of revenue following a catastrophic failure event of a business server system.

Figure 3:
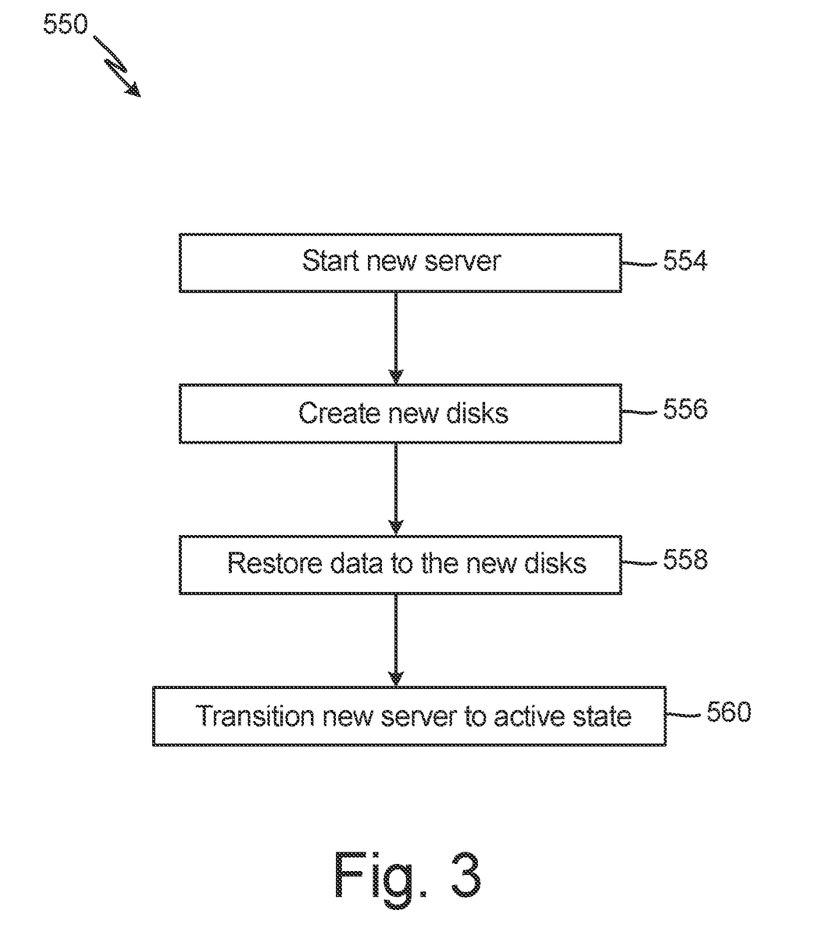
FIG. 3 is a flow diagram of an example of a method of restoring a database, suitable for use with the method of FIG. 2.

FIG. 3 is a flow diagram of an example of method 550, which is a method of restoring a database suitable for use with the method 500. More specifically, method 550 can be used to restore a database in steps 502-506 of method 500 in examples where the backup stored on the backup server (i.e., backup application server 210, first backup database server 220, second backup database server 230, and/or third backup database server 240) is copied to a new server that is subsequently transitioned into an active state to replace a server of the failed business server system 102. Method 550 includes steps of starting the new server (step 554), creating new disks (step 556), restoring data to the new disks (step 558), and transitioning the server to an active state (step 560). Method 550 can be used with any or all of backup application server 210, first backup database server 220, second backup database server 230, and/or third backup database server 240, but will be discussed with respect to a generic backup server and a generic new server for clarity.

In step 554, power is provided to the new server and the new server is started. Starting the new server places the new server in an operational state, allowing subsequent steps of method 550 to be performed. Generally, the new server is similar to the backup server used with method 550 and includes control circuitry, memory, storage, and a user interface. The control circuitry, memory, storage, and user interface components of the new server are similar to those described with respect to the servers of backup server system 100.

In step 556, new disks are created on the storage of the new server. The disks are virtual disks created on the storage of the new server. One or more disks can be created on a single physical storage device in step 556. Additionally and/or alternatively, the disks can include more than one physical storage device. However, the new virtual disks are created to be identical or substantially identical to the disks of the backup server, such that file paths for each file are identical or substantially identical on the new and backup servers following copying in step 558.

In step 558, all files on the backup server are copied to the new server. Following step 558, the new server is capable of being transitioned to an active state to restore the function of the failed server. In step 560, the new server is transitioned to an active state and can be used with steps 508-518 of method 500.

FIG. 4 is a flow diagram of method 600, is a method of performing a database recovery test. Method 600 can be used, for example, to test method 500 discussed previously with respect to FIG. 2. Method 600 includes steps of disconnecting backup application and database servers (step 602), assigning new network configurations to the backup servers (step 606), starting at least one name server (step 607), providing the new network configurations to the backup application server (step 608), transitioning the backup database servers to an active state (step 610), transitioning the backup application server to an active state (step 612), starting application modules (step 614), validating connections used by the application modules (step 616), validating functionality of the application modules (step 617) stopping the application modules (step 618), deactivating the backup application server (step 620), deactivating the backup database servers (step 622), and reconnecting the backup application and database servers (step 624). For explanatory purposes, method 600 will be discussed with reference to backup server system 100, but method 600 can be used to perform database recovery for a variety of server systems.

Method 600 is usually performed prior to a catastrophic failure event of business server system 102 in order to test a database recovery method, such as method 500, using backup business server system 202. As such, method 600 is generally performed while business server system 102 is operating as a fully functional production environment.

In step 602, backup application server 210 is disconnected from application server 110, first backup database server 220 is disconnected from first database server 120, second backup database server 230 is disconnected from second database server 130, and third backup database server 240 is disconnected from third database server 140. Backup application server 210 is disconnected by severing, at a hardware and/or software level, communication links 192G,192K and/or communication link 192O. First backup database server 220 is disconnected from first database server 120 by severing, at a hardware and/or software level, communication links 192H,192L and/or communication link 192P. Similarly, second backup database server 230 is disconnected from second database server 130 by severing, at a hardware or software level, communication links 192I, 192M and/or communication link 192R. Third backup database server 240 is disconnected from third database server 140 by severing, at a hardware and/or software level, communication links 192J,192N and/or communication link 192S. In some examples, backup application server 210, first backup database server 220, second backup database server 230, and third backup database server 240 are disconnected from business server system 102 at substantially the same time. As the servers of backup business server system 202 are configured to copy and back up data from the servers of business server system 102, disconnecting all components of backup business server system 202 at the same time or substantially advantageously reduces or prevents the servers of backup business server system 202 from having backups taken at different time points, thereby reducing or preventing system inconsistency errors during subsequent steps of method 500.

After step 602, backup application server 210, first backup database server 220, second backup database server 230, and third backup database server 240 remain connected in a virtual network (VNET) bubble and are not connected to any other components of backup server system 100 or to the internet. Further, the servers of backup business server system 202 also retain their previous network configurations used to connect to other components of backup server system 100 following step 602. In step 606, new network configurations are assigned to each of backup application server 210, first backup database server 220, second backup database server 230, and third backup database server 240. The new network configurations assigned in step 606 provide new network addresses, such as new internet protocol (IP) addresses, and/or other network configuration information that are specific to the VNET created in step 602. The new network configurations are specific to the VNET created in step 602 and, as such, step 606 is performed subsequent to steps 602.

Notably, where backup server system 100 includes a name server, disconnecting application server 110, first backup database server 220, second backup database server 230, and third backup database server 240 in step 602 also disconnects application server 110, first backup database server 220, second backup database server 230, and third backup database server 240 from the name server. In these examples, method 600 includes optional step 607, in which at least one new name server is started within the VNET created following step 602 and prior to step 606. The at least one name server can be a physical machine that is connected within the VNET created after step 602 or the at least one name server can be implemented as a virtual machine on a server of backup business server system 202. Where method 600 includes step 607, the network configurations assigned in step 604 also include new names that can be translated to network addresses by the new name server.

In step 608, the new network configurations assigned in step 606 are provided to backup application server 210. The new network configurations can be automatically provided to backup application server 210 (e.g., they can be automatically pushed to backup application server 210 by first, second, and third backup database servers 220,230,240 or automatically pulled by backup application server 210) or they can be provided manually by, for example, a user overseeing method 600. Providing the new network configurations to backup application server 210 allows backup application server 210 to locate first backup database server 220, second backup database server 230, and third backup database server 240 on the VNET during subsequent steps of method 600.

Prior to method 600, all servers of backup business server system 202 are in inactive states as business server system 102 is the active server system. The VNET and new network configurations created following step 608 enables backup business server system 202 to also be transitioned to an active state, as backup business server system 202 is no longer connected to and is on a VNET distinct from business server system 102. Transitioning backup business server system 202 allows backup business server system 202 to emulate a production environment and thereby be used to test database recovery methods.

In step 610, first backup database server 220, second backup database server 230, and third backup database server 240 are transitioned to active states. In step 612, backup application server 210 is transitioned to an active state. To avoid errors resulting from backup application server 210 attempting to access data on first backup database server 220, second backup database server 230 while first backup database server 220 and second backup database server 230, and/or third backup database server 240 are inactive, step 612 is performed subsequent to step 610. Advantageously, reducing errors in step 610 also reduces the overall time required to perform method 600.

In step 614, the application modules of application module set 150B are started. Step 614 is substantially similar to steps 508-516 of method 500, but starts search module 180B, PCM module 182B, web connectivity module 184B, GUI module 186B, and at least one business application module of business application modules 188B rather than any application module of application module set 150A. The order in which application modules of application module set 150B are started is also substantially similar to the order for substantially the same reasons as outlined in the discussion of steps 508-516 of method 500. As application modules of application module set 150B require backup application server 210 to be in an active state to run, step 614 is performed subsequent to step 612.

In step 616, connections used by the application modules of application module set 150B are validated. Step 616 is performed in substantially the same manner for substantially the same reasons as described previously with respect to the validation of connections of application module set 150A in step 518 of method 500. Step 616 is performed subsequent to step 614 so that connections used by application module set 150B are validated while the application modules of application module set 150B are running. Validation of connections used by application modules of application module set 150B in step 616 indicates that backup business server system 202 is able to successfully perform database recovery following a catastrophic failure of business server system 102.

Method 600 optionally includes step 617, in which functionality of the application modules of application module set 150B is validated. Step 617 is performed in substantially the same manner for substantially the same reasons as described previously with respect to the validation of connections of application module set 150A in step 519 of method 500. Validation of functionality of application modules of application modules set 150B can also be used to indicate that backup business server system 202 is able to successfully perform database recovery following a catastrophic failure of business server system 102.

Once the ability of backup server system 202 to perform database recovery has been verified via step 616 or both steps 616 and 617, backup business server system 202 can be transitioned back to an inactive state and resume backup up data from business server system 102. Steps 618-624 relate generally to the process of transitioning backup business server system 202 to an inactive state.

In step 618, application modules of backup application server 210 are stopped. Stopping application modules of backup application server 210 is required to transition backup application server 210 to an inactive state and, accordingly, is performed prior to step 620. Performing step 620 prior to step 618 can cause errors that significantly increase the time required to perform method 600.

In step 620, backup application server 210 is transitioned back to an inactive state. In step 622, first backup database server 220, second backup database server 230, and third backup database server 240 are transitioned to inactive states. Performing step 622 prior to step 620 can resulting from backup application server 210 attempting to access data on first backup database server 220, second backup database server 230, and/or third backup database server 240 while first backup database server 220, second backup database server 230, and/or third backup database server 240 are inactive, potentially significantly increasing the time required to perform method 600. Performing step 620 prior to step 622 reduces or prevents the incidence of these errors.

In step 624, backup application server 210, first backup database server 220, second backup database server 230, and third backup database server 240 are reconnected to application server 110, first database server 120, second database server 130, and third database server 140 respectively, by reconnecting the connections that were severed in step 602.

Advantageously, method 600, and in particular steps 602-608 and 624, enables isolated testing of database recovery methods. Isolated testing of database recovery methods decreases the incidence of system inconsistency or other errors that can occur during the testing of database recovery methods while allowing an active server system to remain online as a production environment. Further, steps 610-616 of method 600 are advantageously similar to steps 502-518 of method 500, decreasing the time required to test database recovery using backup server system 100 or another suitable server system for the same reasons as outlined with respect to method 500. Notably, backup servers do not continue to backup data during database recovery testing and the time required to test database recovery is generally greater than the threshold interval for acceptable data loss (discussed previously with respect to method 500 and FIG. 2). Using conventional methods of database recovery, testing the readiness of a backup server system can take several days or weeks. Conversely, performing database recovery testing with method 600 requires significantly less time than existing methods. In some examples, method 600 can be performed in eight hours. Reducing the time required to test database recovery advantageously reduces the likelihood that a catastrophic failure event occurs during database recovery testing and further reduces the extent of unacceptable data loss in the event that catastrophic failure occurs during database recovery testing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of database recovery, the method comprising:
starting a first database server, wherein:
the first database server is configured to store data according to a first database management system, and
starting the first database server comprises restoring the first database server from a first database backup;
starting a second database server, wherein:
the second database server is configured to store data according to a second database management system, and
starting the second database server comprises restoring the second database server from a second database backup;
starting an application server after starting the first database server and the second database server, wherein:
starting the application server from comprises restoring the application server from an application server backup,
the application server is configured to run application modules of a set of application modules, and
the set of application modules comprises:
a web connectivity module configured to allow other application modules of the set of application modules to connect to the Internet;
a search module for searching at least one of the first database server and the second database server;
a product catalog management module for managing a product catalog; and
starting the search module;
starting the product catalog management module; and
starting the web connectivity module after starting the search module, wherein the web connectivity module is configured to request data from the search module.

2. The method of claim 1, wherein the set of application modules further comprises a graphical user interface module configured to request data from the web connectivity module and to request data from the search module, and further comprising starting the graphical user interface module.

3. The method of claim 1, wherein the set of application modules further comprises at least one business operations module configured to request data from at least one of the search module, the product catalog management module, and the web connectivity module, and further comprising starting the at least one business operations module.

4. The method of claim 3, wherein starting the at least one business operations module comprises starting the at least one business operations module after the at least one of the search module, the product catalog management module, and the web connectivity module.

5. The method of claim 3, wherein the at least one business operations module is one or more of a credit card verification module, a shipping address verification module, a reporting module, or a financial consolidation module.

6. The method of claim 3, and further comprising starting a third database server before starting the application server, wherein the search module is configured to search at least one of the first database server, the second database server, and the third database server.

7. The method of claim 3, further comprising validating, after starting the at least one business operations module, connections used by application modules of the set of application modules.

8. The method of claim 7, further comprising using, after validating connections used by the set of application modules, the application server, the first database server, the second database server, and the third database server to perform a business operation.

9. The method of claim 7, further comprising validating, after starting the at least one business operations module, functionality of application modules of the set of application modules.

10. The method of claim 9, wherein the set of application modules further comprises a graphical user interface module configured to request data from the web connectivity module and to request data from the search module, and further comprising starting the graphical user interface module, and wherein validating connections used by application modules of the set of application modules comprises validating that:
  the web connectivity module is able to request data from the search module;
  the graphical user interface module is able to request data from the web connectivity module;
  the graphical user interface module is able to request data from the search module; and
  the at least one business operations module is able to request data from at least one of the search module, the product catalog management module, and the web connectivity module.

11. The method of claim 1, further comprising:
  copying, before starting the first database server and the second database server:
    a first data set from a first active database server to the first database backup;
    a second data set from a second active database server to the second database backup;
    the set of application modules from an active application server to the application server backup.

12. The method of claim 1, wherein restoring the first database server comprises:
  starting a first backup database server storing the first database backup;
  creating first virtual disks on the first database server according to the first database backup; and
  copying the first database backup from the first backup database server to the first database server.

13. The method of claim 12, wherein restoring the second database server comprises:
  starting a second backup database server storing the second database backup;
  creating second virtual disks on the second database server according to the second database backup; and
  copying the second database backup from the second backup database server to the second database server.

14. The method of claim 1, wherein:
  the first database server is restored using a first recovery tool;
  the second database server is restored using a second recovery tool; and
  the application server is restored using a third recovery tool.

15. The method of claim 1, wherein starting at least one of the first database server and the second database server comprises switching the at least one of the first database server and the second database server from an inactive state to an active state, wherein:
  in the inactive state, the at least one of the first database server and the second database server in the inactive state is configured to allow data to be copied to the at least one of the first database server and the second database server; and
  in the active state, the at least one of the first database server and the second database server is configured to allow data to be read from the at least one of the first database server and the second database server.

16. A method of performing a database recovery test, the method comprising:
  disconnecting a first backup database server from a first active database server,
    wherein:
      the first backup database server is configured to store data according to a first database management system; and
      the first backup database server is configured to back up a first set of data from the first active database server;
  disconnecting a second backup database server from a second active database server, wherein:
    the second backup database server is configured to store data according to a second database management system; and
    the second backup database server is configured to back up a second set of data from the second active database server;
  disconnecting a backup application server from an active application server,
    wherein:
      the backup application server is configured to back up application modules of a set of application modules from the active application server; and
      the backup application server is configured to run the application modules of the set of application modules;
  assigning new network configurations to the first backup database server, the second backup database server, and the backup application server after disconnecting the first backup database server, the second backup database server, and the backup application server;
  providing the new network configurations for the first backup database server and the second backup database server to the backup application server;
  transitioning the first backup database server to an active state from an inactive state after providing the new network configurations to the backup application server, wherein the first database management system is configured to recall data when the first backup database server is active;
  transitioning the second backup database server to an active state from an inactive state, wherein the second database management system is configured to recall data when the second backup database server is active;
  transitioning the backup application server to an active state from an inactive state after transitioning the first backup database server to an active state and transitioning the second backup database server to an active state, wherein the backup application server is configured to recall data from at least one of the first backup database server and the second backup database server;
  starting the set of application modules;
  validating connections used by application modules of the set of application modules;
  stopping the set of application modules after validating connections;
  transitioning the backup application server to an inactive state after stopping the set of application modules;
  transitioning the first backup database server and the second backup database server to inactive states after transitioning the backup application server to an inactive state; and
  reconnecting, after transitioning the first backup database server and the second backup database server to inactive states:
    the first backup database server to the first active database server;
    the second backup database server to the second active database server; and
    the backup application server to the active application server.

17. The method of claim 16, and further comprising:
  disconnecting a third backup database server from a third active database server, wherein:

the third backup database server is configured to store data according to a third database management system; and the third backup database server is configured to back up a third set of data from the third active database server;

the backup application server is configured to recall data from at least one of the first backup database server, the second backup database server, and the third backup database server;

assigning new network configurations to the third backup database server after disconnecting the third backup database server;

providing the new network configurations for the third backup database server to the backup application server;

transitioning the third backup database server to an active state from an inactive state before transitioning the backup application server, wherein the third database management system is configured to recall data when the third backup database server is active;

transitioning the third backup database server to an inactive state after transitioning the backup application server to an inactive state; and reconnecting the third backup database server to the third active database server after transitioning the third backup database server to the inactive state.

18. The method of claim 17, wherein, prior to assigning new network configurations, the first active database server has a first network configuration, the second active database server has a second network configuration, the third backup database server has a third network configuration, and the active application server has a fourth network configuration, and further comprising, after deactivating the first backup database server, the second backup database server, the third backup database server, and the backup application server and before reconnecting the first backup database server, the second backup database server, the third backup database server, and the backup application server:

assigning the first network configuration to the first backup database server;

assigning the second network configuration to the second backup database server; and assigning the third network configuration to the third backup database server.

19. The method of claim 18, wherein the set of application modules comprises:

a web connectivity module configured to allow other application modules of the set of application modules to connect to the Internet;

a search module for searching at least one of the first database server, the second database server, and the third database server;

a product catalog management module for managing a product catalog;

a graphical user interface module configured to allow a user to interact with one or more application modules of the set of application modules; and at least one business operations module.

20. A method of database recovery, the method comprising:

starting a first database server and a second database server, wherein:

the first database server is configured to store data according to a first database management system, the second database server is configured to store data according to a second database management system starting at least one of the first database server and the second database server comprises switching the at least one of the first database server and the second database server from an inactive state to an active state, in the inactive state, the at least one of the first database server and the second database server is configured to allow data to be copied to the at least one of the first database server and the second database server; and in the active state, the at least one of the first database server and the second database server is configured to allow data to be read from the at least one of the first database server and the second database server;

starting an application server after starting the first database server and the second database server, wherein:

the application server is configured to run application modules of a set of application modules, and the set of application modules comprises:

a web connectivity module configured to allow other application modules of the set of application modules to connect to the Internet;

a search module for searching at least one of the first database server and the second database server;

a product catalog management module for managing a product catalog; and starting the search module;

starting the product catalog management module; and starting the web connectivity module after starting the search module, wherein the web connectivity module is configured to request data from the search module.

\* \* \* \* \*